United States Patent [19]
Morikawa et al.

[11] Patent Number: 6,052,358
[45] Date of Patent: Apr. 18, 2000

[54] HEAD FEEDING MECHANISM AND OPTICAL PICK-UP FEEDING MECHANISM

[75] Inventors: Toru Morikawa; Takashi Izuka, both of Kanagawa, Japan

[73] Assignee: Sony Corporation, Tokyo, Japan

[21] Appl. No.: 08/942,103

[22] Filed: Oct. 1, 1997

[30] Foreign Application Priority Data

Oct. 4, 1996 [JP] Japan ................................ 8-281618

[51] Int. Cl.[7] .................................................. G11B 17/30
[52] U.S. Cl. .......................................... 369/219; 369/223
[58] Field of Search .................................. 369/215, 219, 369/220, 221, 222, 223

[56] References Cited

U.S. PATENT DOCUMENTS

| | | | |
|---|---|---|---|
| 4,096,537 | 6/1978 | Butsch | 360/106 |
| 4,392,219 | 7/1983 | Yokozawa et al. | 369/44 |
| 4,807,211 | 2/1989 | Getreuer | 369/44 |
| 4,942,565 | 7/1990 | Lagadec | 369/59 |
| 4,982,398 | 1/1991 | Yamamoto et al. | 369/119 |
| 5,023,856 | 6/1991 | Raaymakers et al. | 369/32 |
| 5,191,575 | 3/1993 | Kido | 369/223 |
| 5,210,738 | 5/1993 | Iwata et al. | 369/275.1 |
| 5,247,507 | 9/1993 | Morimoto et al. | 369/111 |
| 5,303,223 | 4/1994 | Sakaguchi et al. | 369/215 |
| 5,339,302 | 8/1994 | Takahashi et al. | 369/124 X |
| 5,377,178 | 12/1994 | Saito et al. | 369/124 |
| 5,432,772 | 7/1995 | Yamamoto | 369/219 |
| 5,499,224 | 3/1996 | Sanada | 369/48 |
| 5,506,824 | 4/1996 | Fairchild et al. | 369/48 |
| 5,508,985 | 4/1996 | Fairchild et al. | 369/48 |
| 5,510,937 | 4/1996 | Mogamiya | 359/823 |
| 5,555,228 | 9/1996 | Izuka | 369/44.15 |
| 5,572,507 | 11/1996 | Ozaki et al. | 369/275.4 |
| 5,587,901 | 12/1996 | Yamagami et al. | 369/275.3 |
| 5,615,185 | 3/1997 | Horikiri | 369/44.13 |
| 5,615,205 | 3/1997 | Belser | 369/275.4 |
| 5,666,235 | 9/1997 | Izuka | 359/814 |
| 5,682,365 | 10/1997 | Carasso et al. | 369/54 |
| 5,684,772 | 11/1997 | Yamagami et al. | 369/59 |
| 5,737,639 | 4/1998 | Ohmori | 395/893 |
| 5,754,522 | 5/1998 | Kobayashi et al. | 369/275.3 |
| 5,835,478 | 11/1998 | Kobayashi et al. | 369/275.3 |
| 5,878,024 | 3/1999 | Kobayashi et al. | 369/275.3 |
| 5,886,985 | 3/1999 | Kobayashi et al. | 369/275.3 |

FOREIGN PATENT DOCUMENTS

| | | | |
|---|---|---|---|
| 0487321 A2 | 5/1992 | European Pat. Off. | G11B 7/007 |
| 3-292684 | 12/1991 | Japan . | |
| 8-339641 | 12/1996 | Japan . | |

OTHER PUBLICATIONS

Patent Abstracts of Japan, vol. 97, No. 4, Apr. 30, 1997, JP 83–39641, Published Dec. 24, 1996, Matsushita Electric Ind. Co. Ltd.

Patent Abstracts of Japan, No. 9 (020), Sep. 30, 1996, JP 8–138333, Published May 31, 1996, Toshiba Corp.

Patents Abstracts of Japan, No. 12 (023), Dec. 26, 1996, JP 8–212726, Published Aug. 20, 1996, Sony Corporation.

*Primary Examiner*—Stuart S. Levy
*Assistant Examiner*—Kenneth Fields
*Attorney, Agent, or Firm*—Limbach & Limbach LLP; Seong-Kun Oh

[57] ABSTRACT

A head feeding mechanism used for an apparatus for recording and/or reading information signals on/from such a recording medium as an optical disk comprises a head mechanism, a feed screw, a rotation driving mechanism, a base, and a forcing mechanism. The feed screw is engaged with the head mechanism and rotated to feed the head mechanism. The rotation driving mechanism drives the feed screw to rotate. On the base is arranged the rotation driving mechanism. The base includes a pair of bearings used for the feed screw. At least one of the pair of bearings is a thrust bearing. The forcing mechanism is provided on the base and butts against one end of the feed screw. The forcing mechanism applies a force working on the feed screw both in the thrust direction and in the direction orthogonal to the thrust direction.

14 Claims, 7 Drawing Sheets

HEAD FEEDING MECHANISM AND OPTICAL PICK-UP FEEDING MECHANISM

BACKGROUND OF THE INVENTION

The present invention relates to a head feeding mechanism and an optical pick-up feeding mechanism, more particularly to a head feeding mechanism and an optical pick-up feeding mechanism that use a feed screw.

There is provided a feeding mechanism in which a feed screw is used for feeding an optical pick-up as a head for recording and/or reading information signals on/from an optical disk as a disk-like recording medium. FIG. 1 shows an example of such a feeding mechanism.

A feed screw a comprises a thread part b, a gear c linked to one end of the thread part b, and a receiving part d that are integrally formed. The feed screw a is rotatably supported by two bearings disposed with a certain distance therebetween in the axial direction of the feed screw.

In the feed screw a, one end of the thread part b provided with the gear c and the receiving part d is supported by a bearing e and the other end of the thread part b, at which neither gear c nor receiving part d is formed, is supported by an unillustrated thrust bearing. The gear c is linked to a motor via an unillustrated intermediate gear. The receiving part d is put in contact elastically with an elastic body f. Thus, the feed screw a is pressed by a force F2 shown in FIG. 1 in the axial direction.

One side of the bearing e is opened so as to mount the feed screw a. On the opening side of the bearing e is attached with a holding member g used to prevent the feed screw a from falling.

Consequently, the feed screw a is engaged with an unillustrated feed nut provided in the base of an optical pick-up, so that the optical pick-up is moved in the radial direction of the optical disk due to the rotation of the feed screw a driven by a motor.

In the feeding mechanism shown in FIG. 1, clearances $\Delta x1$ and $\Delta x2$ necessary for allowing the free rotation of the feed screw a are provided between the feed screw a and the bearing e.

These clearances $\Delta x1$ and $\Delta x2$ cause the feed screw a to generate an excessive play in the C direction shown in FIG. 1 when the feed screw a rotates. This further causes collision between the feed screw a and the bearing e, which results in generation of vibration in the feeding mechanism. This generated vibration, when transmitted to the optical pick-up, disables the optional pick-up to read signals recorded on the optical disk. When the vibration is large, track-jumps will occur, causing sound skipping.

In order to solve such the troubles, a measure may be taken to determine the dimensions of the feed screw a and the bearing e for minimizing the clearances $\Delta x1$ and $\Delta x2$. This measure, however, leads to other problems; dimensions of those parts must be managed more strictly and friction loss due to the rotation (load) of the feed screw a and the bearing e is increased.

Especially, in the case that the bearing e and the holding member g provided on the opening side of the bearing e are formed with different members as described above, it is very difficult to minimize the clearances $\Delta x1$ and $\Delta x2$ because of the influence of the summation of the dimensional tolerances of those members.

SUMMARY OF THE INVENTION

It is therefore an object of the present invention to provide a head feeding mechanism which solves the above-mentioned problems.

It is another object of the present invention to provide an optical pick-up feeding mechanism which solves the above-mentioned problems.

According to the present invention, there is provided a head feeding mechanism including a head mechanism, a feed screw, a rotation driving mechanism, a base, and a forcing mechanism. The feed screw is engaged with the head mechanism and is rotated to feed the head mechanism. The rotation driving mechanism drives the feed screw to rotate. On the base is arranged the rotation driving mechanism. The base includes a pair of bearings used for the feed screw. At least one of the pair of bearings is a thrust bearing. The forcing mechanism is provided on the base and butts against one end of the feed screw. The forcing mechanism applies a force working on the feed screw both in the thrust direction and in the direction orthogonal to the thrust direction.

According to the present invention, there is provided an optical pick-up feeding mechanism including a pick-up base, a guide mechanism, a feed screw, a rotation driving mechanism, a base, and a forcing mechanism. The pick-up base includes an optical pick-up. The guide mechanism guides the pick-up base. The feed screw is engaged with the pick-up base and is rotated to feed the pick-up base along the guide mechanism. The rotation driving mechanism drives the feed screw to rotate. On the base is arranged the guide mechanism and the rotation driving mechanism. The base includes a pair of bearings used for the feed screw. At least one of the pair of bearings is a thrust bearing. The forcing mechanism is provided on the base and butts against one end of the feed screw. The forcing mechanism applies a force working on the feed screw both in the thrust direction and in the direction making a specified angle between the thrust direction so that components of the force is applied to work on the feed screw both in the thrust direction and in at least one direction orthogonal to the thrust direction.

DESCRIPTION OF THE PREFERRED EMBODIMENTS

Hereunder, the head feeding mechanism of this invention will be described in detail with reference to the attached drawings. In each embodiment of the present invention to be described below, the feeding mechanism is explained by means of an example which is taken as an optical pick-up feeding mechanism used for an optical disk reproducing apparatus that uses a read-only type optical disk (hereinafter referred to as an optical disk) such as a so-called compact disk as a recording medium.

Figure 1:
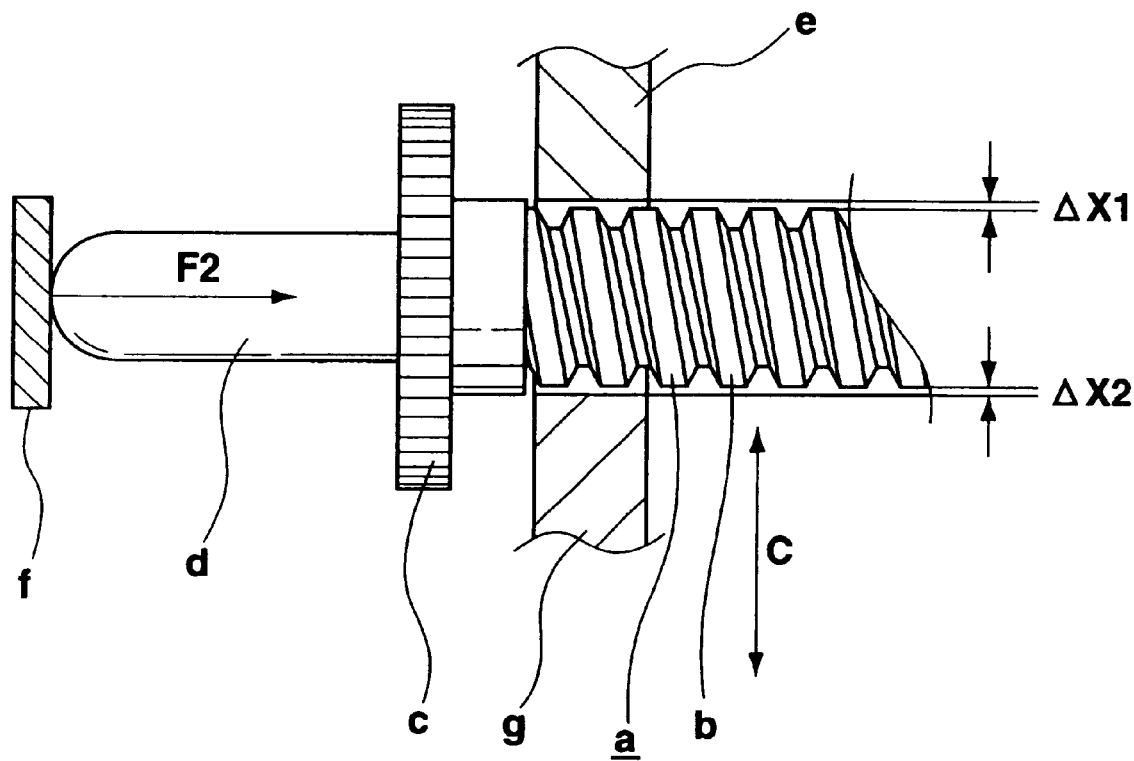
FIG. 1 is an expanded sectional view of a feeding mechanism as a premise of the present invention.
Figure 2:
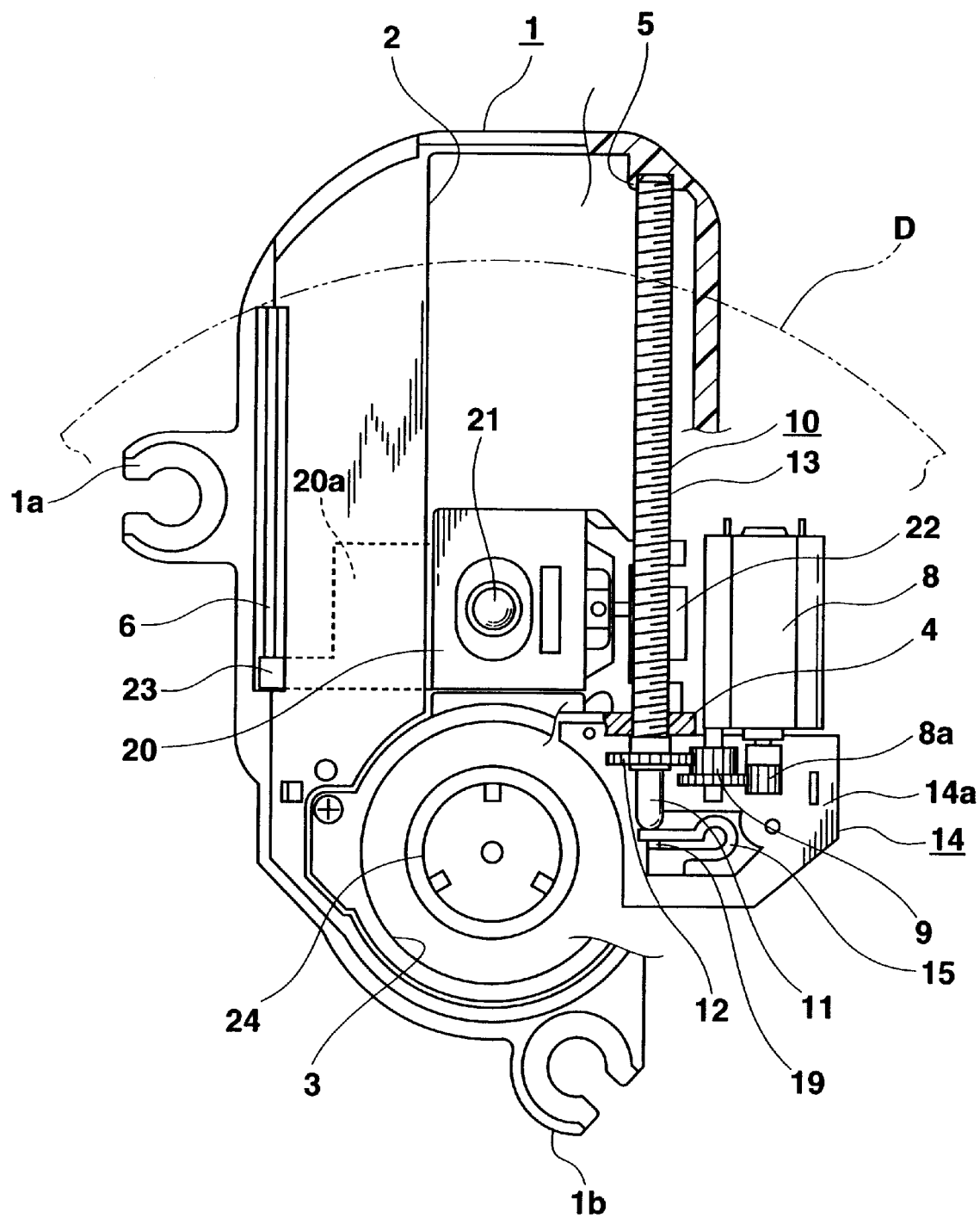
FIG. 2 is a top view of an optical pick-up of the first embodiment according to the present invention.

As shown in FIG. 2, the optical pick-up feeding mechanism according to the first embodiment of the present invention includes a base 1 made of synthetic resin. At the base 1 are formed an opening 2, and a fixing opening 3. The opening 2 is rectangularly formed in the radial direction of the optical disk D, and a later described optical pick-up moves in the opening 2 in the radial direction of the optical disk D. The fixing opening 3 is formed almost in a circle, and an unillustrated spindle motor is fixed through the fixing opening 3. At the tip of the rotary shaft of the spindle motor fixed to the base 1 through the opening 3 is attached a disk table 24 on which an optical disk is loaded. The optical disk D loaded on the disk table 24 is rotated at, for example, a constant linear speed. The opening 2 is significantly large enough to allow at least the whole surface of the signal recorded area of the optical disk D to be scanned by the later described optical pick-up.

The optical pick-up 20 comprises an objective lens 21, an unillustrated actuator for driving the objective lens 21 both in the focusing direction and in the tracking direction, an unillustrated semiconductor laser used as a light source, an unillustrated photosensor, an unillustrated optical system, and a feeding base 20a on which the actuator, the semiconductor laser, the photosensor, and the optical system are arranged. The objective lens 21 is arranged on the feeding base 20a so that it is moved on a locus matching with a straight line passing the diameter of the optical disk when the optical pick-up 20 is fed in the radial direction of the optical disk D by a feeding mechanism formed with a feed motor 8, a driving gear 8a and an intermediate gear 9 that drives a feed screw 10 to rotate via a gear 12 provided at one end of the feed screw 10. The feeding base 20a is also provided with a nut 22 engaged with the feed screw 10 and an engager 23 to be engaged with the guide to be described later. The engager 23 is arranged between a pair of projections 20b and 20b, each of which has a through hole for inserting the feed screw 10.

Figure 6:
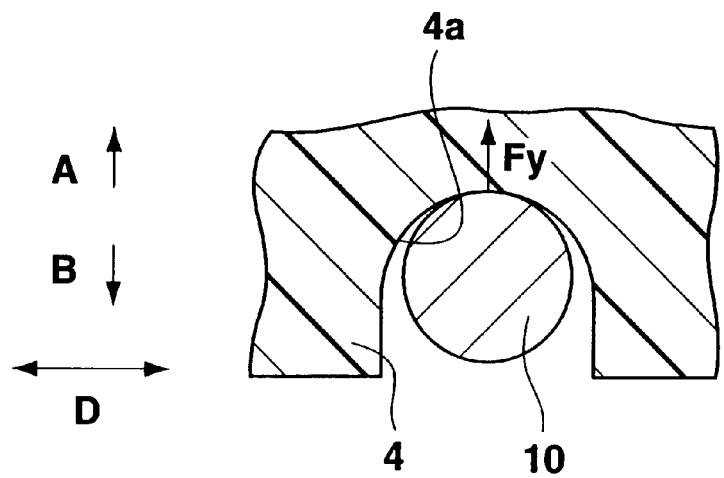
FIG. 6 is a cross sectional view taken along the V—V line shown in FIG. 5.

The base 1 is provided with a pair of bearings 4 and 5 for supporting the feed screw 10 on one side and is also provided with a guide 6 on the other side, with the optical pick-up 20 arranged therebetween in the opening 2. The bearing 4 of one of the pair of bearings 4 and 5 is formed to have a cross sectional shape with an opening for supporting the feed screw 10 being opened to have free space toward the back of the paper surface, so that the opening is formed approximately in a U shape with the upper half becoming a curved surface 4a as shown in FIG. 6. The other bearing 5 is formed as a thrust bearing opened toward the inside of the opening 2. The engager 23 of the feeding base 20a is engaged with the guide 6.

Figure 3:
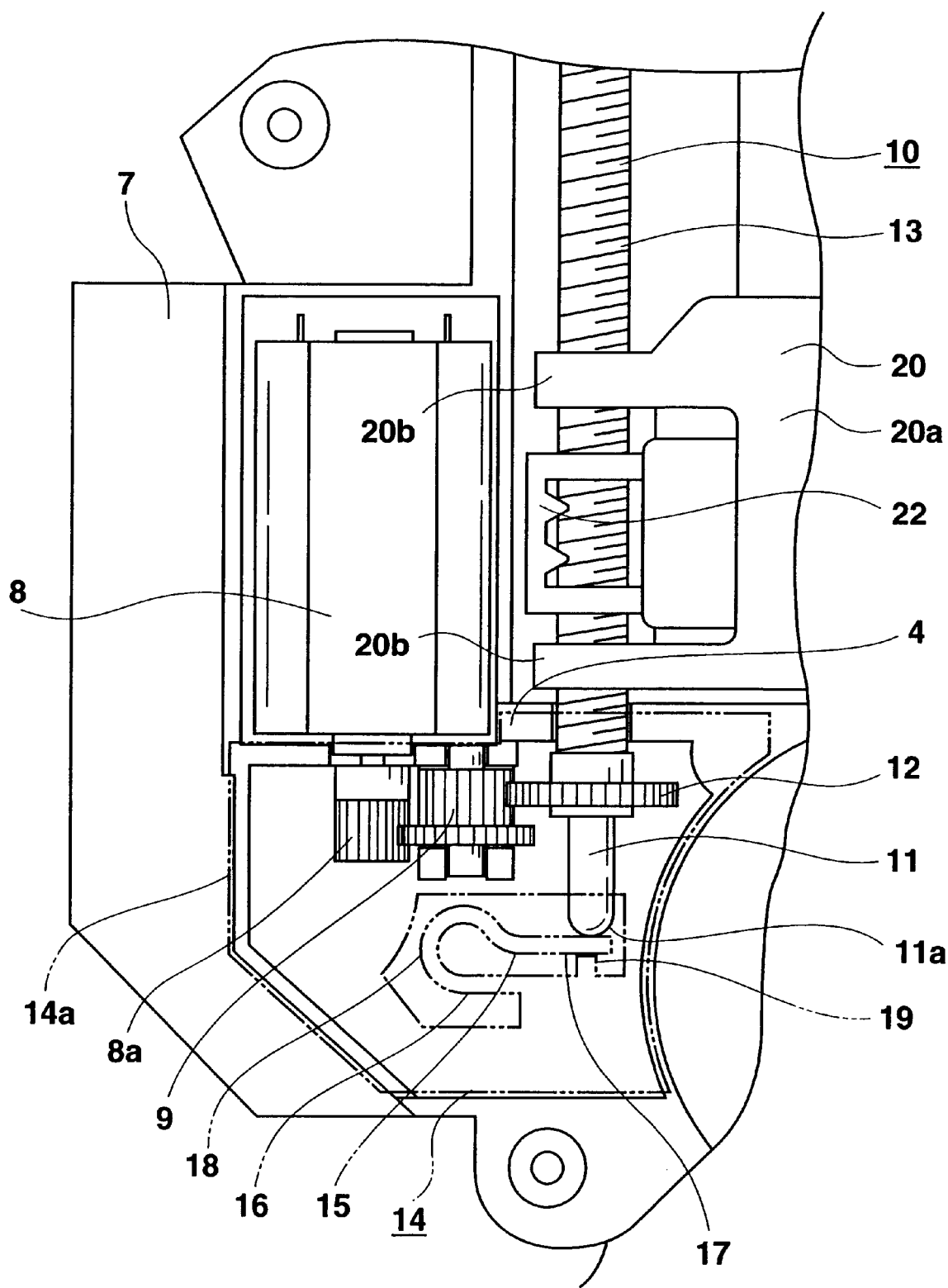
FIG. 3 is an expanded top view of the major part of the optical pick-up feeding mechanism in the first embodiment.

In FIG. 3, there is shown a fixture 7 formed so as to be protruded from the base 1. As shown in FIGS. 2 and 3 the fixture 7 includes the feed motor 8 forming the feeding mechanism for rotating the feed screw, the driving gear 8a, and the intermediate gear 9. The feed motor 8 is arranged at the fixture 7 so that its rotary shaft becomes almost in parallel to the feed screw 10. The driving gear 8a is fixed to the rotary shaft of the feed motor 8 and the driving gear 8a is engaged with the intermediate gear 9. The intermediate gear 9 is fixed to the fixture 7 so that the rotary shaft of the gear 9 can be rotated freely.

As shown in FIG. 2, the base 1 is provided with a plurality of projections 1a and 1b protruded outside from the base 1. The base 1 is fixed to an unillustrated chassis of a reproducing apparatus with those projections 1a and 1b via dampers, if required. In FIG. 2, only two projections are shown due to the space for the drawing, but actually three projections are formed on the base 1.

As shown in FIG. 2, the feed screw 10 includes a thread part 13 occupying almost the whole portion of the feed screw 10, and, in addition to the gear part 12, a protrusion 11 is provided on its one end. The thread part 13 is integrally formed with the protrusion 11. The gear 12 is later attached to the feed screw by fitting. The protrusion 11 is protruded from the thread part 13 of the feed screw 10 as shown in FIGS. 2 and 3, and its tip 11a (FIG. 3) is formed like a semisphere. The tip 11a of the protrusion 11 butts against a forcing part to be described later. The feed screw 10 is supported by the bearing 4 at its one end at which the gear 12 is provided and by the bearing 5 as the thrust bearing at the other end on the side opposite to the guide 6 of the base 1 across the opening 2 in which the optical pick-up 20 is arranged between the feed screw 10 and the guide 6. The feed screw 10 is inserted into through holes of a pair of the projections 20b and 20b of the feeding base 20a with its thread part 13 being engaged with the nut 22 of the feeding base 20a. The gear 12 of the feed screw 10 is engaged with the intermediate gear 9. Consequently, the rotating force of the feed motor 8 is transmitted to the feed screw 10 via both the driving gear 8a and the intermediate gear 9 so as to rotate the feed screw 10. Since the feed screw 10 is engaged with the nut 22 of the optical pick-up 20, the rotation of the feed screw 10 causes the optical pick-up 20 to be moved in the radial direction of the optical disk D along the guide 6. As a result, the light beam irradiating on the optical disk D through the objective lens 21 scans the optical disk D to read the data recorded on the optical disk D.

Figure 4:
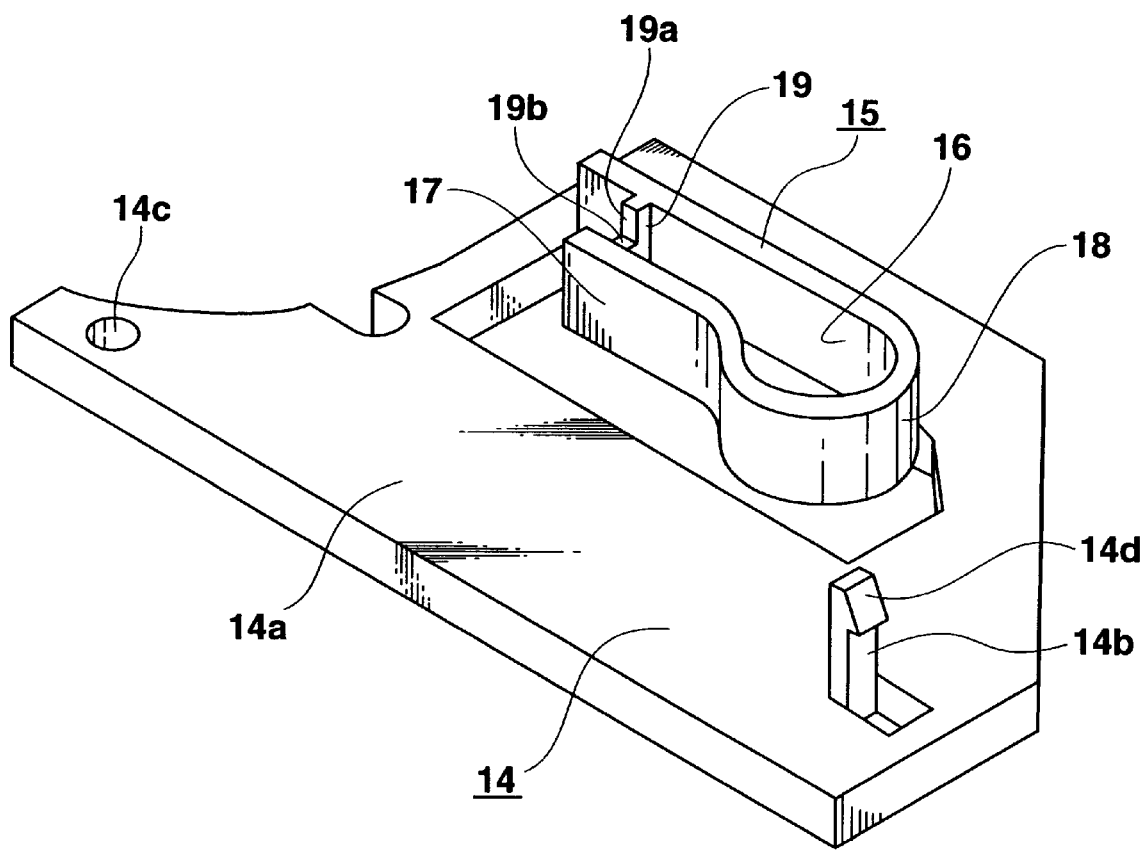
FIG. 4 is an expanded perspective view of a holding member used for the optical pick-up feeding mechanism in the first embodiment.

As shown in FIGS. 2 and 3, a holding member 14 is attached to the base 1 so as to cover one side of the feed motor 8 that rotates the feed screw 10, the driving gear 8a, and the intermediate gear 9. The holding member 14, as shown in FIG. 4, includes an engaging part 14b, a through hole 14c for inserting a screw, and a forcing part 15 that are made of resin and integrally formed with a plate 14a so as to have a size enough to cover one side of the feed motor 8, the driving gear 8a, and the intermediate gear 9. The engaging part 14b is formed so as to be protruded from the plate 14a with a catch 14d at its tip for engaging with an unillustrated engaging hole formed on the base 1. With the catch 14d being engaged with the engaging hole of the base 1, a screw is inserted through the through hole 14c and the screw is engaged with an unillustrated screw hole of the base 1 so that the holding member 14 is fixed to the base 1 so as to cover one side of the feed motor 8, the driving gear 8a, and the intermediate gear 9.

Figure 5:
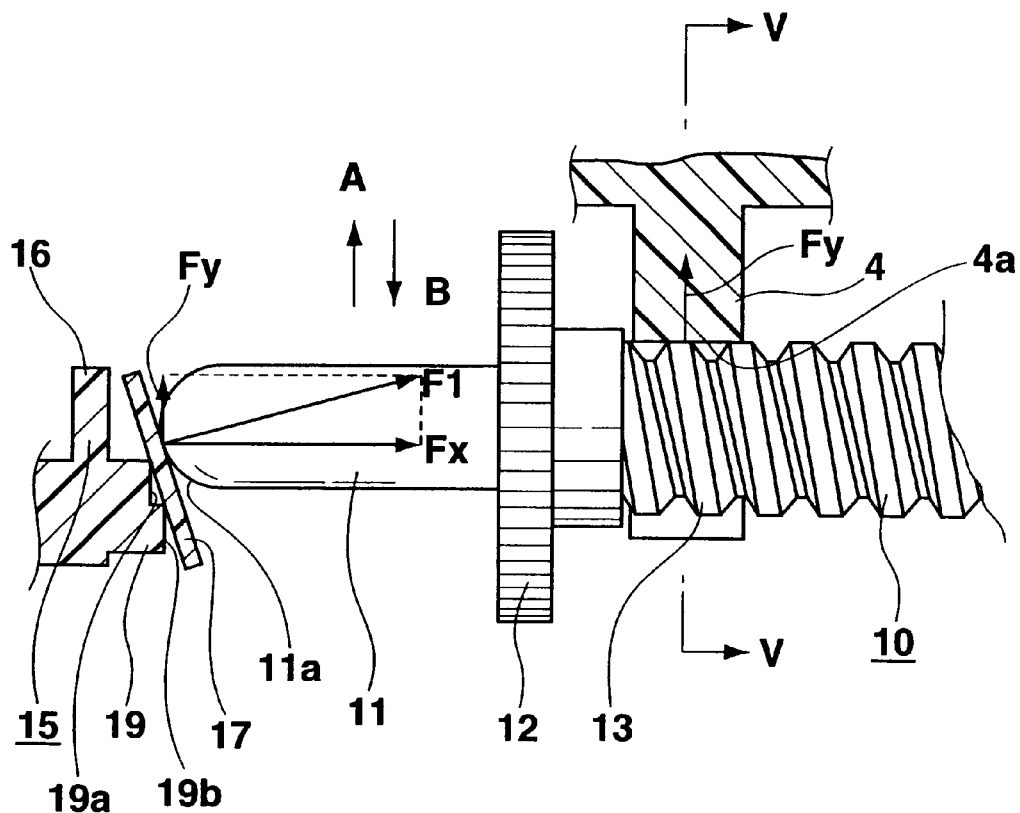
FIG. 5 is a cross sectional view illustrating how a feed screw is pressed against the inner surface of the bearing.

As shown in FIGS. 2 and 3, the forcing part 15 formed on the holding member 14 butts against the tip 11a of the protrusion 11 of the feed screw 10 with the holding member 14 being fixed to the base 1. The forcing part 15 is formed to become approximately a U shape by a base part 16 and a butting part 17 with a bent elastic displacement part 18 therebetween. At the base part 16 is formed a projection 19 protruded toward the inside of the forcing part 15. The projection 19 butts against the butting part 17 when the butting part 17 butts against the tip 11a of the protrusion 11 of the feed screw 10, so that the traveling distance of the butting part 17 in the axial direction of the feed screw 10 is limited and a force is applied to the feed screw 10 as shown in FIG. 5. As shown in FIGS. 3 and 5, the projection 19 is formed in a staircase protruded toward the inside of the forcing part 15 with an upper part 19a and a lower part 19b which is protruded more than the upper part 19a. With the tip 11a of the feed screw 10 being formed like a semisphere as described above, the butting part 17 comes almost in point contact with the tip 11a of the feed screw 10. Thus, with the butting part 17 butting against the tip 11a, the friction loss due to the rotation of the feed screw 10 in minimized.

Hereunder, explanation will be made with reference to FIG. 5 for the force to be applied to the feed screw 10 when the holding member 14 is fixed to the base 1 and the butting part 17 of the forcing part 15 butts against the tip 11a of the protrusion 11 of the feed screw 10.

As described above, when the holding member 14 is attached to the base 1 by allowing the catch 14d of the engaging part 14b to be engaged in the engaging hole of the base 1 and by tightening screws inserted through the through holes 14c to secure the holding member 14 to the base 1, the butting part 17 of the forcing part 15 butts against the tip 11a of the feed screw 10. The butting part 17 is pressed by the protrusion 11 of the feed screw 10 in the thrust direction, that is, in the axial direction of the feed screw 10, so that the butting part 17 butts against the projection 19. At this time, the face of the butting part 17, which butts against the feed screw 10, turns upward of FIG. 5 as shown in FIG. 5 as the butting part 17 is pushed against the upper side 19a and the lower side 19b of the projection 19 formed in a staircase. Consequently, an upward force F1 is applied to the feed screw 10. The force F1 applied to the feed screw 10 is, as shown in FIG. 5, decomposed into a component Fx in the axial direction of the feed screw and a component Fy in the direction orthogonal to the component Fx, that is, in the direction orthogonal to the axial direction of the feed screw 10. As a result, a force works on the feed screw 10 in the direction shown with an arrow A in FIGS. 5 and 6, so that the feed screw 10 butts against the inner surface of the bearing 4. The feed screw 10, while being butted against inner surface of the bearing 4, is rotated by the rotating force of the feed motor 8. At this time, the feed screw 10 is prevented from an excessive play to occur in the directions shown with arrows A and B in FIGS. 5 and 6. The feed screw 10 is also prevented from an excessive play to occur in the axial direction of the feed screw 10, since the butting part 17 presses the feed screw 10 with the above-mentioned component Fx in the axial direction. Since the feed screw 10 is rotated with the butting part 17 butting against the tip 11a and with the feed screw 10 butting against the bearing 4 as shown in FIG. 5, the force F1 generated when the butting part 17 butts against the tip 11a of the feed screw 10 is determined so as to cause the smallest possible friction loss, which is generated when the butting part 17 butts against the tip 11a and when the feed screw 10 butts against the bearing 4, yet so as not to cause an excessive play of the feed screw 10. In other words, a force of the elastic displacement part 16 is determined so as to cause the smallest possible friction loss generated when the butting part 17 butts against the tip 11a and when the feed screw 10 butts against the bearing 4, yet so as not to cause an excessive play of the feed screw 10.

Furthermore, as shown in FIG. 6, the bearing 4 is formed so that its upper part becomes approximately in a U shape with the curved surface 4a. Therefore, the thread part 13 of the feed screw 10 butts against the top of the curved surface 4a of the bearing 4 by the component Fy of the force F1 working on the feed screw with the tip 11a of the feed screw 10 butting against the butting part 17. In this state, when the feed screw 10 is rotated by the rotating force from the feed motor 8, the rotation of the feed screw 10 can prevent the excessive play in the directions shown with arrows A and B in FIG. 6, as well as it can suppress the excessive play in the direction shown with an arrow D in FIG. 6.

Subsequently, the optical pick-up feeding mechanism according to the second embodiment of the present invention will be described with reference to FIG. 7. In this second embodiment, only the direction of the force applied to the feed screw by the forcing part differs from that of the first embodiment and other items are same as described in the first embodiment, so that detailed explanation for the same items will be omitted here.

In the first embodiment described above, a force from the forcing part 15 works in two directions, in the axial direction of the feed screw 10 and in the direction orthogonal to the axial direction, as shown in FIG. 5. In this second embodiment, however, the force works in three directions, in the axial direction of the feed screw 10 and in two directions each being orthogonal to the axial direction.

Figure 7:
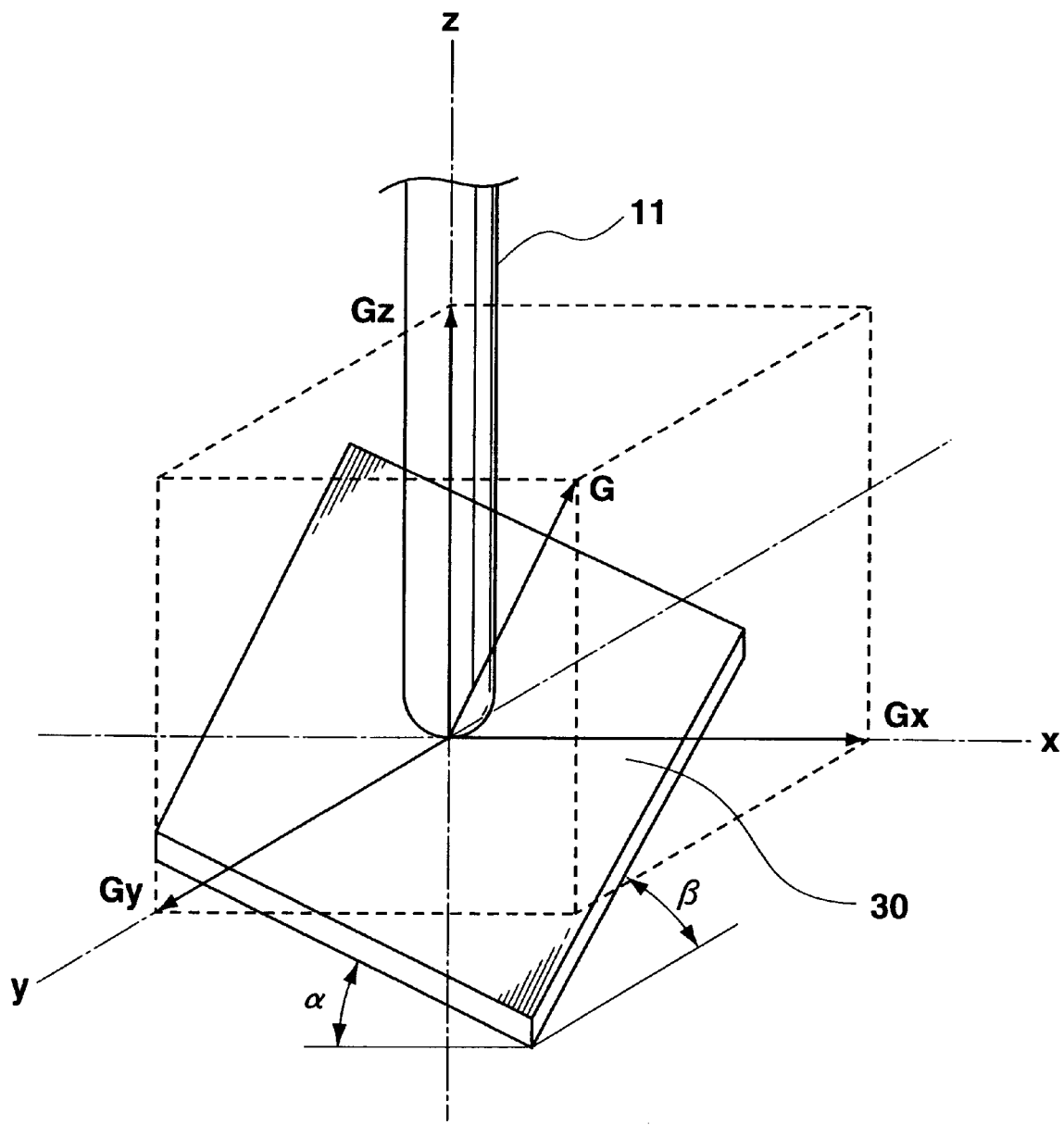
FIG. 7 is a perspective view of the major part of the optical pick-up feeding mechanism in the first embodiment.

As shown in FIG. 7, the forcing part 30 is inclined three-dimensionally so that the force applied by the forcing part 30 is decomposed into three components working in the x axis direction, in the y axis direction, and in the z axis direction, respectively. In other words, a forcing part 30 applies a force working in each of the z axis direction that is the axial direction of the feed screw 10, the first direction orthogonal to the axial direction, for example, the x axis direction and the second direction orthogonal both to the axial direction and to the first direction, for example, the y axis direction. For this purpose, the forcing part 30 is inclined by an angle α to the x axis and by an angle β the y axis. For example, just like in the first embodiment described above, when the holding member 14 is secured to the base 1 by allowing the catch 14d of the engaging part 14b to be engaged in the engaging hole of the base 1 and by tightening screws inserted through the through holes 14c, the forcing part 30 butts against the tip 11a of the feed screw 10. At this time, a force G is applied to the feed screw 10 in the direction perpendicular to the surface of the forcing part 30 as shown in FIG. 7. The force G thus applied to the feed screw 10 is decomposed into components as shown in FIG. 7, Gz working in the axial direction of the feed screw 10, Gx working in the direction orthogonal to this Gz, that is, the first direction orthogonal to the axial direction of the feed screw 10, and Gy working in the second direction orthogonal both to the axial direction of the feed screw 10 and to the first direction. Consequently, the feed screw 10 is prevented from an excessive play to occur in the axial direction due to the component Gz working in the axial direction, as well as from an excessive play to occur in the first direction orthogonal to the axial direction, for example, in the directions shown with arrows A and B in FIG. 5, and from an excessive play to occur in the second direction orthogonal both to the axial direction and to the first direction, for example, in the direction shown with an arrow D in FIG. 6. In the second embodiment, an excessive play can be prevented by changing the inclination angle of the forcing part 30 to increase the component of the force in the direction of such excessive play that is required to be prevented or suppressed.

As described above, in each of the embodiments according to the present invention, the feed screw for feeding the optical pick-up in the radial direction of the optical disk D can be prevented from excessive plays, so that vibration generated due to the feeding of the optical disk can be suppressed to allow data from the optical disk to be read stably.

Figure 8:
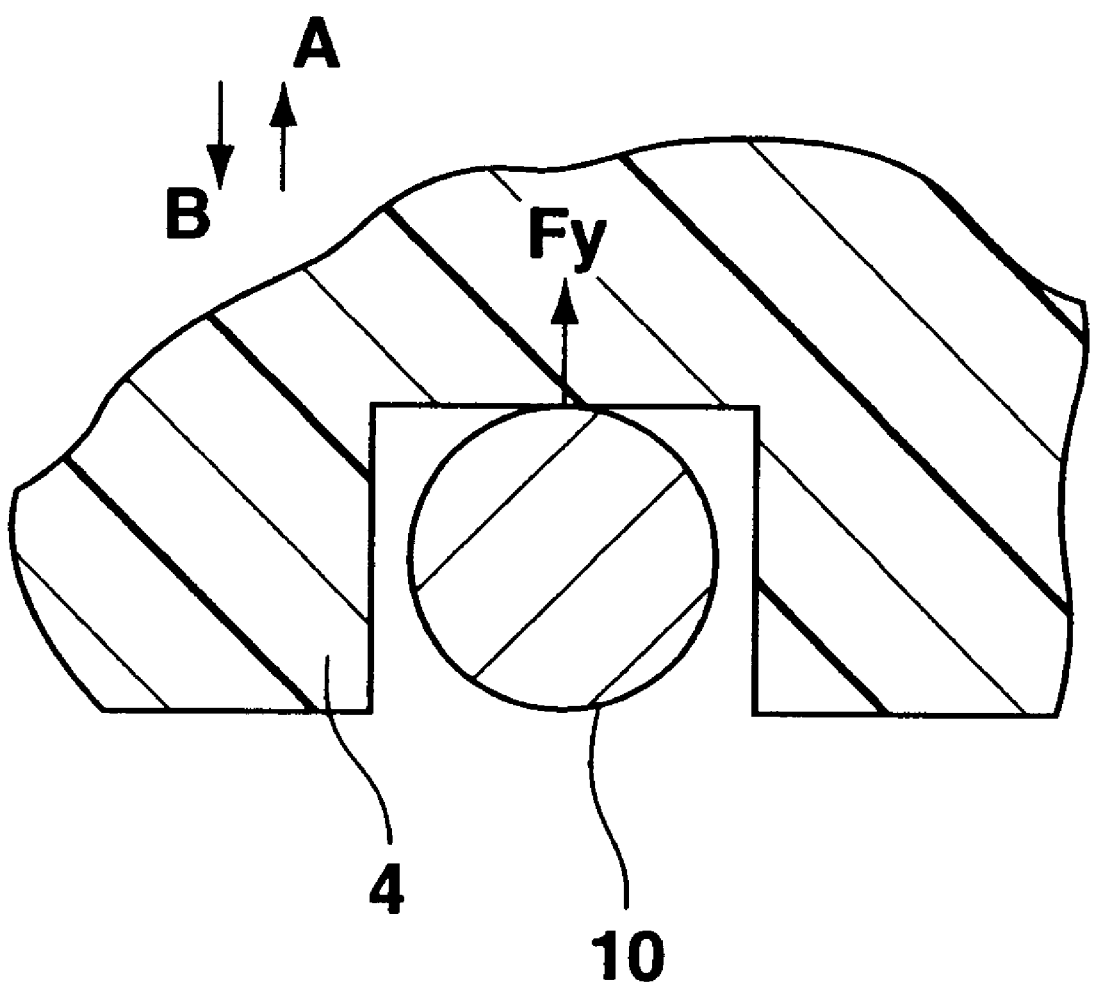
FIG. 8 is a cross sectional view of a modification of the bearing.

Of course, the present invention is not limited to the above-mentioned embodiments. It can be changed within a range in which the concept of the present invention is not largely departed therefrom. For example, in the first embodiment described above, the bearing 4 formed approximately in a U shape with its upper part becoming a curved surface 4a may be formed so that its upper part becomes flat as shown in FIG. 8. In this case, with the butting part 17 butting against the tip 11a, the feed screw 10 is pressed in the direction of arrow A in FIG. 8 due to a component Fy, one of the decomposed components of the force F1 applied to the feed screw 10, so that the feed screw 10 can be prevented from an excessive play to occur in each of the directions shown with arrows A and B in FIG. 8 like in the first embodiment described above. The excessive play to occur in the direction orthogonal to the directions shown with arrows A and B in FIG. 8 can be suppressed by adjusting the clearance between the feed screw 10 and the inner surface of the bearing 4.

In each of the embodiments described above, an optical pick-up feeding mechanism used for an optical disk reproducing apparatus that uses optical disks as recording media was explained as an example of a head feeding mechanism, but the present invention can also be applied to an optical pick-up feeding mechanism used for an optical disk recording apparatus or optical disk recording and reproducing apparatus and a magnetic head feeding mechanism used for a magnetic disk recording and/or reproducing apparatus.

What is claimed is:

1. An optical pickup feeding mechanism, comprising:
   a pick-up base on which an optical pick-up is provided;
   a guide mechanism for guiding said pick-up base;
   a feed screw engaged with said pick-up base, said feed screw being rotated to feed said pick-up base along said guide mechanism;
   a rotation driving mechanism for driving said feed screw to rotate;
   a base on which said guide mechanism and said rotation driving mechanism are arranged, said base including a pair of bearings used for supporting said feed screw, and at least one of a pair of said bearings being a thrust bearing; and
   a forcing mechanism provided on said base and butting at one end of said feed screw, said forcing mechanism applying a force working on said feed screw both in a thrust direction and in a direction making an angle between said thrust direction to apply components of said force working on said feed screw both in said thrust direction and at least in one direction orthogonal to said thrust direction;
   wherein said forcing mechanism includes an elastic member butting against one end of said feed screw to apply a force working on said feed screw in said thrust direction, in a first direction orthogonal to said thrust direction, and in a second direction orthogonal both to said thrust direction and to said first direction; and further
   wherein said elastic member includes a butting part and an elastic displacement part, said butting part butting against one end of said feed screw, and said elastic displacement part generating components of said force working on said feed screw butting against said butting part in said thrust direction, in said first direction and in said second direction.

2. The mechanism of claim 1 wherein said butting part and said elastic displacement part are integrally formed approximately in a U shape with synthetic resin.

3. The mechanism of claim 1 wherein said optical pick-up includes:
   an objective lens; and
   an actuator for driving said objective lens;
   wherein said actuator is configured to drive said objective lens in a focusing direction and in a tracking direction.

4. The mechanism of claim 3 wherein said feed screw includes a thread portion, a gear portion and a protrusion portion, said protrusion portion corresponding to said one end of said feed screw configured to butt against said forcing mechanism.

5. The mechanism of claim 4 wherein said thread portion comprises substantially the entire feed screw.

6. The mechanism of claim 5 wherein said protrusion portion is formed substantially as a semisphere.

7. The mechanism of claim 4 wherein said protrusion portion is formed substantially as a semisphere.

8. The mechanism of claim 1 wherein said feed screw includes a thread portion, a gear portion and a protrusion portion, said protrusion portion corresponding to said one end of said feed screw configured to butt against said forcing mechanism.

9. The mechanism of claim 8 wherein said thread portion comprises substantially the entire feed screw.

10. The mechanism of claim 9 wherein said protrusion portion is formed substantially as a semisphere.

11. The mechanism of claim 8 wherein said protrusion portion is formed substantially as a semisphere.

12. A method of feeding an optical pickup mechanism, comprising the steps of:
    providing an optical pick-up on a pick-up base;
    guiding said pick-up base by a guide mechanism;
    engaging a feed screw with said pick-up base, said feed screw being rotated to feed said pick-up base along said guide mechanism;
    driving said feed screw to rotate by a rotation driving mechanism;
    arranging said guide mechanism and said rotation driving mechanism on a base, said step of arranging further including the step of supporting said feed screw with a pair of bearings; and
    providing a forcing mechanism on said base and butting at one end of said feed screw, said step of providing said forcing mechanism includes the step of butting an elastic member against one end of said feed screw to apply a force working on said feed screw in a thrust direction, in a first direction orthogonal to said thrust direction, and in a second direction orthogonal both to said thrust direction and to said first direction;
    wherein said step of butting said elastic member includes the steps of:
       butting a butting part of said elastic member against one end of said feed screw, and
       generating, using an elastic displacement part of said elastic member, components of said force working on said feed screw butting against said butting part in said thrust direction, in said first direction and in said second direction.

13. The method of 12 further including integrally forming said butting part and said elastic displacement part approximately in a U shape with synthetic resin.

14. The method of 12 further including integrally forming said butting part and said elastic displacement part approximately in a U shape with synthetic resin.

* * * * *